(12) United States Patent
Huebner et al.

(10) Patent No.: US 9,869,184 B2
(45) Date of Patent: Jan. 16, 2018

(54) GAS TURBINE BLADE

(71) Applicant: MTU Aero Engines AG, Munich (DE)

(72) Inventors: Norbert Huebner, Dachau (DE); Inga Mahle, Munich (DE); Ulrich Haid, Munich (DE); Kai Koerber, Karlfeld (DE)

(73) Assignee: MTU AERO ENGINES AG, Munich (DE)

( * ) Notice: Subject to any disclaimer, the term of this patent is extended or adjusted under 35 U.S.C. 154(b) by 390 days.

(21) Appl. No.: 14/677,343

(22) Filed: Apr. 2, 2015

(65) Prior Publication Data

US 2015/0285080 A1 Oct. 8, 2015

(30) Foreign Application Priority Data

Apr. 4, 2014 (EP) .................................... 14163476

(51) Int. Cl.
*F01D 5/14* (2006.01)
*F01D 9/02* (2006.01)
*F04D 29/32* (2006.01)

(52) U.S. Cl.
CPC ............. *F01D 5/147* (2013.01); *F01D 5/141* (2013.01); *F04D 29/324* (2013.01); *F01D 9/02* (2013.01);
(Continued)

(58) Field of Classification Search
CPC . F01D 5/141; F01D 5/147; F01D 9/02; F01D 9/041; F04D 29/324; F04D 29/384; F04D 29/542; F05B 2250/712; F05B 2240/12; F05B 2240/301; F05D 2240/122; F05D 2240/123; F05D 2240/124; F05D 2240/12; F05D 2240/121; F05D 2240/301; F05D 2240/303; F05D 2240/304; F05D 2240/305; F05D 2240/306; F05D 2250/712
(Continued)

(56) References Cited

U.S. PATENT DOCUMENTS 6,264,429 B1 * 7/2001 Koeller ................... F01D 5/141
416/223 A
2005/0232778 A1 10/2005 Kakishita et al.
(Continued)

FOREIGN PATENT DOCUMENTS

EP 2360377 A2 8/2011
GB 2102505 A 2/1983
(Continued)

*Primary Examiner* — Christopher Verdier
(74) *Attorney, Agent, or Firm* — Barlow, Josephs & Holmes, Ltd.

(57) ABSTRACT

A blade for a gas turbine has a leading edge and a trailing edge, which are connected by a pressure side and an intake side. In at least one segment of a stacking axis, the blade has a cross section with a profile with a common profile tangent at a leading edge region and a trailing edge region, a leading edge tangent at the leading edge, which is perpendicular to the common profile tangent, a trailing edge tangent at the trailing edge, which is perpendicular to the common profile tangent, and a camber line, which extends, at an equal distance from the pressure side and the intake side, from a center point of a leading edge circle, up to a center point of a trailing edge circle.

12 Claims, 1 Drawing Sheet

(52) U.S. Cl.
CPC ..... *F05B 2240/12* (2013.01); *F05B 2240/301* (2013.01); *F05D 2240/121* (2013.01); *F05D 2240/122* (2013.01); *F05D 2240/301* (2013.01); *F05D 2240/303* (2013.01); *F05D 2240/304* (2013.01); *F05D 2250/712* (2013.01); *Y02T 50/673* (2013.01)

(58) Field of Classification Search
USPC .... 415/191, 208.1, 208.2, 211.2; 416/223 R, 416/223 A, 243, DIG. 2, DIG. 5
See application file for complete search history.

(56) References Cited

U.S. PATENT DOCUMENTS

| | | | |
|---|---|---|---|
| 2008/0181780 A1* | 7/2008 | Sonoda | F04D 29/384 416/223 A |
| 2014/0112795 A1* | 4/2014 | Hamabe | F01D 5/14 416/223 R |
| 2014/0373503 A1* | 12/2014 | Hanlon | G05B 19/401 60/39.01 |

FOREIGN PATENT DOCUMENTS

| | | |
|---|---|---|
| WO | 9859175 A1 | 12/1998 |
| WO | 2012147938 A1 | 11/2012 |

* cited by examiner

GAS TURBINE BLADE

BACKGROUND OF THE INVENTION

The present invention relates to a blade for a gas turbine as well as to a gas turbine having at least one such blade and a method for the dimensional design of such a blade.

Known from WO 2012/147938 is a gas turbine blade with an asymmetrical trailing edge, the blade thickness of which is relatively constant extending to the trailing edge.

BRIEF SUMMARY OF THE INVENTION

An object of an embodiment of the present invention is to improve a gas turbine.

This object is achieved by a blade with the features of the present invention. The present invention provides a gas turbine with a corresponding blade and a method for the dimensional design of such a blade. Advantageous embodiments of the invention are set forth herein.

A gas turbine blade comprises, in general, an upstream leading edge and a downstream trailing edge, which are connected by a discharge or pressure side, which, in particular, is concave, and an intake side, which, in particular, is convex. A blade element is constructed from profile cross sections, which are arranged so as to overlap along a stacking axis, for diverting the flow, wherein said axis passes through the centers of gravity of the profile cross-sectional surface areas and, in one embodiment of the present invention, is curved or is at least substantially rectilinear in the peripheral and/or axial direction of the gas turbine and can extend in the radial direction of the gas turbine or be inclined toward it.

In a cross section perpendicular to the stacking axis or the radial direction, the blade has a profile or an outer contour. This profile has a common pressure-side profile tangent at a leading edge region and at a trailing edge region. Said profile tangent can be formed, in particular, by a line or can be a line, which is placed or rests on the profile from the pressure side, preferably so that it contacts the profile in at least two points, without intersecting it, that is, in graphic terms, without intersecting the line on which the profile would rest on the pressure side. In one embodiment, a leading edge region in terms of the present invention extends from the leading edge toward the trailing edge, particularly over at most 25% of a chord length of the profile; a trailing edge region correspondingly extends from the trailing edge toward the leading edge, particularly over at most 25% of the chord length of the profile. Accordingly, in one embodiment, the common profile tangent at the leading edge region and at the trailing edge region in terms of the present invention results from the fact that, starting from the leading edge, a point on the profile on the pressure side shifts in the direction of the trailing edge until the tangent at the point on the profile also contacts the profile in the trailing edge section. In graphic terms, a tangent tilts at the profile, starting from the leading edge, from the pressure side toward the trailing edge region and then forms the common profile tangent.

The profile has a leading edge tangent at the leading edge, which is perpendicular to the common profile tangent. In graphic terms, this is formed or can be formed, in particular, by a normal line to the common profile tangent, which is placed or rests on the profile in the flow direction. In a corresponding way, the profile has a trailing edge tangent at the trailing edge that is parallel to the leading edge tangent and is perpendicular to the common profile tangent and, in graphic terms, is formed or can be formed by a normal line to the common profile tangent, which will be placed or rests on the profile opposite to the flow direction.

If the profile has a distinct tangent at a contact point with the common profile tangent, at a contact point with the leading edge tangent, and/or at a contact point with the trailing edge tangent, that is, in particular, it can always be differentiated, then the common profile tangent, the leading edge tangent, or the trailing edge tangent can be this distinct or mathematical tangent. If the profile does not have any distinct tangent at the contact point and, in particular, has a corner at the contact point, the common profile tangent, as explained above, would particularly be a line on which the pressure side of the profile would rest; at the leading edge, the line perpendicular to it would be placed on the profile in the flow direction, and at the trailing edge tangent, the line perpendicular to the common profile tangent would be placed on the profile opposite to the flow direction. The term "tangent" is not to be understood in the strictly mathematical sense in the present case, but rather in general terms as defined above as "contacting" or "resting against/resting on."

A circle whose center point lies at the point of intersection of the normal lines or perpendicular lines at the contact point of the leading edge tangent on the profile with a profile center line that extends through the profile at an equal distance from the pressure side and the intake side, and includes this contact point, defines a leading edge circle in terms of the present invention. In a corresponding way, particularly in the case of a curved trailing edge, the circle whose center point lies at the point of intersection of the normal lines or perpendicular lines at the contact point of the trailing edge tangent on the profile with the profile center line, and includes this contact point, defines a trailing edge circle in terms of the present invention. In particular, in the case of a cornered or truncated trailing edge and/or when this normal line does not intersect the profile center line, the circle that includes at least one point of the pressure side and at least one point of the intake side, and whose center point lies at the point of intersection of the profile center line with the truncated trailing edge and/or which has a minimum diameter, defines a trailing edge circle in terms of the present invention. The profile has a camber line, which is defined in terms of the present invention such that it extends, at an equal distance from the pressure side and the intake side, from the center point of the leading edge circle to the center point of the trailing edge circle. The camber line thus forms a well-defined segment of the profile center line, which extends through the profile, at an equal distance from the pressure side and the intake side.

The distance between the pressure side and the intake side at a point of the camber line defines a blade thickness at this point of the camber line in terms of the present invention. In graphic terms, this can correspond particularly to the diameter of a circle that is inscribed in the profile or contacts the pressure side and the intake side, respectively, in at least one point, which does not intersect the pressure side and the intake side, and the center point of which lies at this point of the camber line.

Surprisingly, it has been found that a certain increase in blade thickness in a specific end region of at least one section of the blade element can improve the performance of the blade and, in particular, can reduce any undesired detachment of the flow at the trailing edge.

Accordingly a blade is proposed according to an aspect of the present invention, whose blade profile, in at least one segment of the stacking axis, has a thickness that, starting from the trailing edge thickness at the center point of the trailing edge circle in a camber line segment, whose length is at least 15%, in particular at least 19%, and at most 25%, preferably at most 21%, of the length of the camber line between the center point of the leading edge circle and the center point of the trailing edge circle, and extending toward the center point of the leading edge circle or in the direction of the center point of the leading edge circle, increases to at least two times and, in particular, to at least 2.5 times the trailing edge thickness.

In one embodiment, the blade thickness, starting from the trailing edge thickness in the camber line segment and extending toward the center point of the leading edge circle, increases in a monotonic manner and, in particular, in a strictly monotonic manner. A (strictly) monotonic increase is understood in the present case in the conventional technical sense to mean that the blade thickness, at each first point of the camber line that, as measured on the camber line, lies closer to the center point of the leading edge circle than an arbitrary second point of the camber line, is at least as large as (in a monotonic manner) and/or always larger (in a strictly monotonic manner) than the blade thickness at the second point.

As a result, in one embodiment, the performance of the blade is further improved; in particular, any undesired detachment of the flow at the trailing edge can be more strongly reduced. In one embodiment, the blade thickness, in a region of the camber line segment nearer the trailing edge, this region starting from the center point of the trailing edge circle and the length of which is at most 50% of the length of the camber line segment, increases linearly extending toward the center point of the leading edge circle. As a result of such a linear change in the blade thickness only on the trailing edge side, it is possible to improve the transition into the remaining pressure side and intake side. Similarly, in another embodiment, the blade thickness can increase linearly in region of the camber line segment that is nearer the trailing edge, this region starting from the center point of the trailing edge circle and the length of which is at least 50% and, in particular, up to 100% of the length of the camber line segment, toward the center point of the leading edge circle. As a result of such a longer linear change in blade thickness, it is possible to improve the manufacture and/or structural characteristics.

In one embodiment, a maximum blade thickness is at least 15% and/or at most 30% of the length of the camber line between the center point of the leading edge circle and the center point of the trailing edge circle. In the case of such thicker blades, it has been found to be especially advantageous when, in a region of the camber line segment nearer the trailing edge, this region extending to an end of the camber line segment nearer the leading edge, the length of this region being at least 50% of the length of the camber line segment, the blade thickness increases in a monotonically increasing manner toward the center point of the leading edge circle. In other words, the course of the blade thickness along the camber line is concave in the camber line segment or at least in its portion nearer the leading edge.

In another embodiment, a maximum blade thickness is at least 4% and/or at most 15% of the length of the camber line between the center point of the leading edge circle and the center point of the trailing edge circle. In the case of such thinner blades, it has been found to be especially advantageous when, in a region of the camber line segment nearer the leading edge, this region extending to an end of the camber line segment nearer the leading edge, the length of this region being at least 50% of the length of the camber line segment, the blade thickness increases in a monotonically decreasing manner toward the center point of the leading edge circle. In other words, the course of the blade thickness is convex along the camber line in the camber line segment or at least in its portion nearer the leading edge. Such an increase in a monotonically decreasing manner can also be advantageous for thicker blades. Therefore, in an embodiment in which a maximum blade thickness is at least 15% and/or at most 30% of the length of the camber line between the center point of the leading edge circle and the center point of the trailing edge circle, the blade thickness increases in a region of the camber line segment, this region extending to an end of the camber line segment nearer the leading edge, the length of which is at least 50% of the length of the camber line segment, in a monotonically increasing manner toward the center point of the leading edge circle.

In one embodiment, the trailing edge thickness is at most 0.5 mm, in particular at most 0.4 mm, preferably at most 0.35 mm. Additionally or alternatively, a wedge angle at the trailing edge is at least 9° and/or at most 17°. These values have been found to be especially advantageous.

In one embodiment, the segment of the stacking axis, in which the profile is designed as explained above, extends over at least 25% and, in particular, at least 75% of a height of the blade element. In particular, at a transition of the blade section to a blade root and/or a shroud-free blade tip or a blade shroud, the profile can be designed, likewise as explained above, so as, in particular, to further improve the aerodynamic performance, or it can be designed differently from this, particularly with lesser blade thickening in the direction to the leading edge, so as to further improve the manufacture and/or thermal and/or mechanical performance. Correspondingly, in one embodiment, the segment of the stacking axis in which the profile is designed as explained above, extends from at least 30% to at least 70% of the height of the blade element or at least in a central region of the blade element.

In one embodiment, a blade in accordance with the invention is a guide vane that is stationary or fixed in place in the housing, particularly stationary or moving, for a compressor stage or a turbine stage of the gas turbine, or a guide vane of a compressor stage or a turbine stage of a gas turbine in accordance with the invention. In another embodiment, a blade in accordance with the invention is mounted so as to rotate or is a rotating blade affixed to the rotor for a compressor stage or a turbine stage of the gas turbine, or a rotating blade of a compressor stage or a turbine stage of a gas turbine in accordance with the invention. Surprisingly, a profile in accordance with the invention can improve the performance of guide vanes as well as rotating blades of both compressor and turbine stages.

A blade in accordance with the invention is used with particular advantage in an aircraft engine.

According to an aspect of the present invention, the profile of a blade, in particular of a guide vane or rotating blade of a compressor stage or a turbine stage of a gas turbine, particularly of an aircraft engine, is designed specifically such that the blade thickness, extending from the trailing edge thickness in the camber line segment toward the center point of the leading edge circle, increases to at least two times and, in particular, to at least 2.5 times the trailing edge thickness. In an enhancement, the profile is specially designed such that the above described blade results.

BRIEF DESCRIPTION OF THE DRAWINGS

Further advantageous enhancements of the present invention ensue from the dependent claims and the following description of preferred embodiments. Shown for this purpose in a partially schematic manner is:

DETAILED DESCRIPTION OF THE INVENTION

Figure 1:
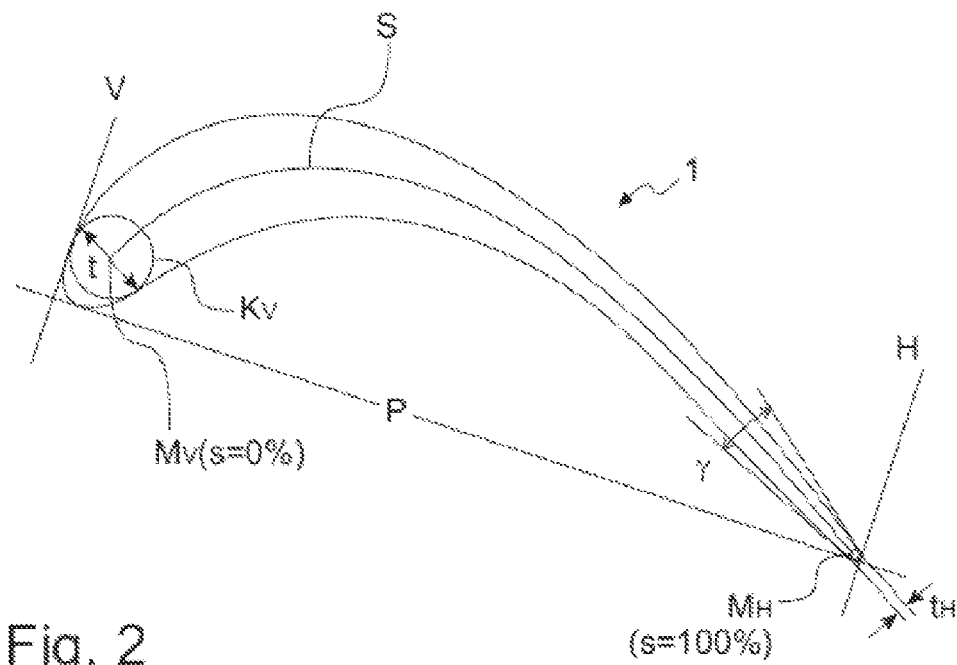
FIG. 1 a profile cross section for explanation of the various terms.

FIG. 1 shows, in a partially schematic manner, a profile cross section of a blade element of a guide vane or rotating blade 1 of a gas turbine.

The profile has a leading edge (left in FIG. 1) and a trailing edge (right in FIG. 1), which are connected by a pressure side (top in FIG. 1) and an intake side (bottom in FIG. 1), as well as a wedge angle γ of 16° at the trailing edge.

P refers to a common profile tangent at the leading edge and trailing edge; V refers to a leading edge tangent at the leading edge, which is perpendicular to the common profile tangent; H refers to a trailing edge tangent at the trailing edge, which is perpendicular to the common profile tangent; and S refers to a camber line, which extends, at an equal distance from the pressure side and the intake side, from a center point $M_V$ of a leading edge circle $K_V$ inscribed in the profile, which has the leading edge tangent in common with the profile, to a center point $M_H$ of a trailing edge circle analogously inscribed in the profile, which has the trailing edge tangent in common with the profile.

Figure 2:
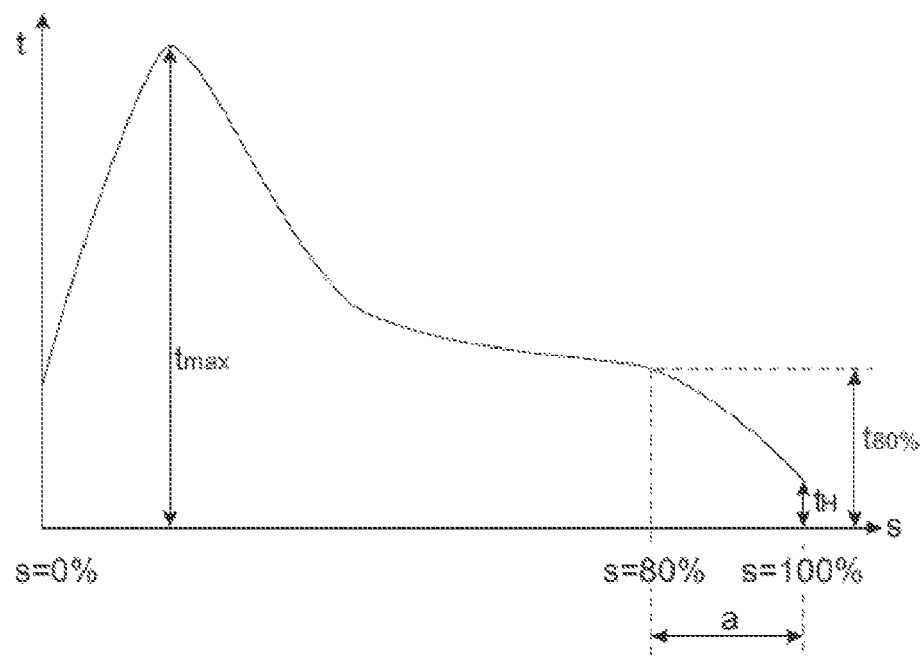
FIG. 2 the course of a blade thickness over a length of a camber line of a profile according to an embodiment of the present invention.

FIG. 2 shows the course of the blade thickness t (compare FIG. 1) over the camber line (length) of a profile, according to an embodiment of the present invention, from the center point $M_V$ of the leading edge circle (s=0%) to the center point $M_H$ of the trailing edge circle (s=100%).

It can be seen that the blade thickness t increases, starting from a trailing edge thickness $t_H$ at the center point of the trailing edge circle (s=100%), which, in the exemplary embodiment, can be, in particular, 0.3 mm, in a camber line segment a, the length of which is 20% of the length of the camber line between the center point of the leading edge circle and the center point of the trailing edge circle (a=[0.8 s, s]→|a|=(s−0.8 s)=0.2 s), toward the center point of the leading edge circle (toward the left in FIG. 2) to a blade thickness of $t_{80\%}$, which is more than 2.5 times the trailing edge thickness $t_H$ ($t_{80\%}>2.5\ t_H$).

It can be further seen that the blade thickness, proceeding from the trailing edge thickness in the camber line segment toward the center point of the leading edge circle, increases in a strictly monotonic manner.

In so doing, in a non-depicted modification, the blade thickness can increase linearly in a region of the camber line segment nearer the trailing edge (right in FIG. 1), which starts from the center point of the trailing edge circle and the length of which is at least or at most 50% of the length of the camber line segment, toward the center point of the leading edge circle.

In the embodiment shown, the blade thickness in the camber line segment a increases in a monotonically decreasing manner toward the center point of the leading edge circle (toward the left in FIG. 2).

Although, in the preceding description, exemplary embodiments were explained, it is noted that a large number of modifications are possible. Moreover, it is noted that the exemplary embodiments are merely examples, which are not intended in any way to limit the protective scope, the applications, and the structural design. Instead, the preceding description provides the person skilled in the art with guidelines for implementing at least one exemplary embodiment, whereby diverse modifications, in particular with respect to the function and arrangement of the described components, can be carried out, without departing from the protective scope as ensues from the claims and combinations of features equivalent to these.

The invention claimed is:

1. A blade (1) for a gas turbine, comprising:
   a leading edge and a trailing edge, which are connected by a pressure side and an intake side;
   wherein, in at least one segment of a stacking axis, the blade has a cross section with a profile with
   a common profile tangent at a leading edge region and at a trailing edge region,
   a leading edge tangent at the leading edge, which is perpendicular to the common profile tangent, the leading edge tangent having a contact point on the profile and resting on the profile in a flow direction;
   a leading edge circle having the contact point of the leading edge tangent in common, the leading edge circle having a center point that lies at a point of intersection of a normal line at the contact point of the leading edge tangent on the profile with a profile center line that extends through the profile at an equal distance from the pressure side and the intake side and includes this contact point;
   a trailing edge tangent at the trailing edge, which is perpendicular to the common profile tangent, the trailing edge tangent having a contact point on the profile and resting on the profile opposite to the flow direction;
   a trailing edge circle having the contact point of the trailing edge tangent in common and having a center point that lies at a point of intersection of a normal line at the contact point of the trailing edge tangent on the profile with said profile center line and includes this contact point of the trailing edge tangent; and
   a camber line, which extends, at an equal distance from the pressure side and the intake side, from the center point of the leading edge circle, up to the center point of the trailing edge circle;
   wherein the leading edge tangent is parallel to the trailing edge tangent;
   wherein the blade thickness between the pressure side and the intake side increases, extending from a trailing edge thickness at the center point of the trailing edge circle in a camber line segment, the length of which is at least 15% and at most 25% of a length of the camber line between the center point of the leading edge circle and the center point of the trailing edge circle, toward the center point of the leading edge circle, increasing to at least two times the trailing edge thickness.

2. The blade according to claim 1, wherein the blade thickness increases in a monotonic manner, proceeding from the trailing edge thickness in the camber line segment to the center point of the leading edge circle.

3. The blade according to claim 1, wherein the blade thickness increases linearly in a region of the camber line segment near the trailing edge, starting at the center point of the trailing edge circle and the length of the blade thickness is about 50% of the length of the camber line segment and extends toward the center point of the leading edge circle.

4. The blade according to claim 1, wherein a maximum blade thickness is at least 15% and/or at most 30% of the length of the camber line between the center point of the leading edge circle and the center point of the trailing edge circle.

5. The blade according to claim 4, wherein, in a region of the camber line segment near the leading edge, this region extending to an end of the camber line segment near the leading edge, and the length of this region is at least 50% of the length of the camber line segment, the blade thickness increases in a monotonically increasing or decreasing manner toward the center point of the leading edge circle.

6. The blade according to claim 1, wherein a maximum blade thickness is at least 4% and/or at most 15% of the length of the camber line between the center point of the leading edge circle and the center point of the trailing edge circle.

7. The blade according to claim 6, wherein, in a region of the camber line segment near the leading edge, this region extending to an end of the camber line segment near the leading edge, and the length of this region is at least 50% of the length of the camber line segment, the blade thickness increases in a monotonically decreasing manner toward the center point of the leading edge circle.

8. The blade according to claim 1, wherein the segment of the stacking axis extends over at least 25% of the height of the blade element.

9. The blade according to claim 1, wherein the trailing edge thickness is at most 0.5 mm.

10. The blade according to claim 1, wherein a wedge angle at the trailing edge is at least 9° and/or at most 17°.

11. The blade according to claim 1, wherein the blade is a guide vane or rotating blade for a compressor stage or a turbine stage of a gas turbine.

12. The blade according to claim 1, wherein the blade is configured for use in an aircraft engine.

* * * * *